United States Patent [19]

Grube et al.

[11] Patent Number: 5,020,130
[45] Date of Patent: May 28, 1991

[54] UNIVERSAL FREQUENCY ASSIGNMENT PROTOCOL FOR TRUNKED RADIO SYSTEMS

[75] Inventors: Gary W. Grube, Palatine, Ill.; Timothy A. Monahan-Mitchell, Deerfield Beach, Fla.; Kenneth J. Zdunek, Schaumburg, Ill.

[73] Assignee: Motorola, Inc., Schaumburg, Ill.

[21] Appl. No.: 163,359

[22] Filed: Mar. 2, 1988

[51] Int. Cl.⁵ .......................... H04B 1/60; H04B 7/00
[52] U.S. Cl. ........................................... 455/9; 455/15; 455/38; 379/63
[58] Field of Search ............ 455/15, 17, 31, 38, 455/33, 34, 32, 9, 185, 186; 376/82, 94; 379/60-63; 370/94.1

[56] References Cited

U.S. PATENT DOCUMENTS

| 4,012,579 | 3/1977 | Lynk, Jr. et al. | 179/41 A |
| 4,128,740 | 12/1978 | Graziano | 179/2 EB |
| 4,612,415 | 9/1986 | Zdunek et al. | 179/2 EB |
| 4,646,345 | 2/1987 | Zdunek et al. | 379/62 |
| 4,658,435 | 4/1987 | Childress et al. | 455/34 |
| 4,672,601 | 6/1987 | Ablay | 370/31 |
| 4,679,225 | 7/1987 | Higashiyama et al. | 455/32 |
| 4,692,945 | 9/1987 | Zdunek | 455/17 |
| 4,701,944 | 10/1987 | Howard et al. | 379/63 |
| 4,716,407 | 12/1987 | Borras et al. | 340/825.04 |

FOREIGN PATENT DOCUMENTS 2165127A 9/1984 United Kingdom.

Primary Examiner—Curtis Kuntz
Attorney, Agent, or Firm—Steven G. Parmelee

[57] ABSTRACT

A trunked communication system wherein channel assignment information is provided to a requesting subscriber unit in a dual word format that includes separate and specific information regarding both a transmit frequency and a receive frequency. The transmit and receive frequency information is provided in a coded form, which can be decoded by the subscriber unit with reference to a table of information stored therein in conjunction with a simple algorithm.

12 Claims, 3 Drawing Sheets

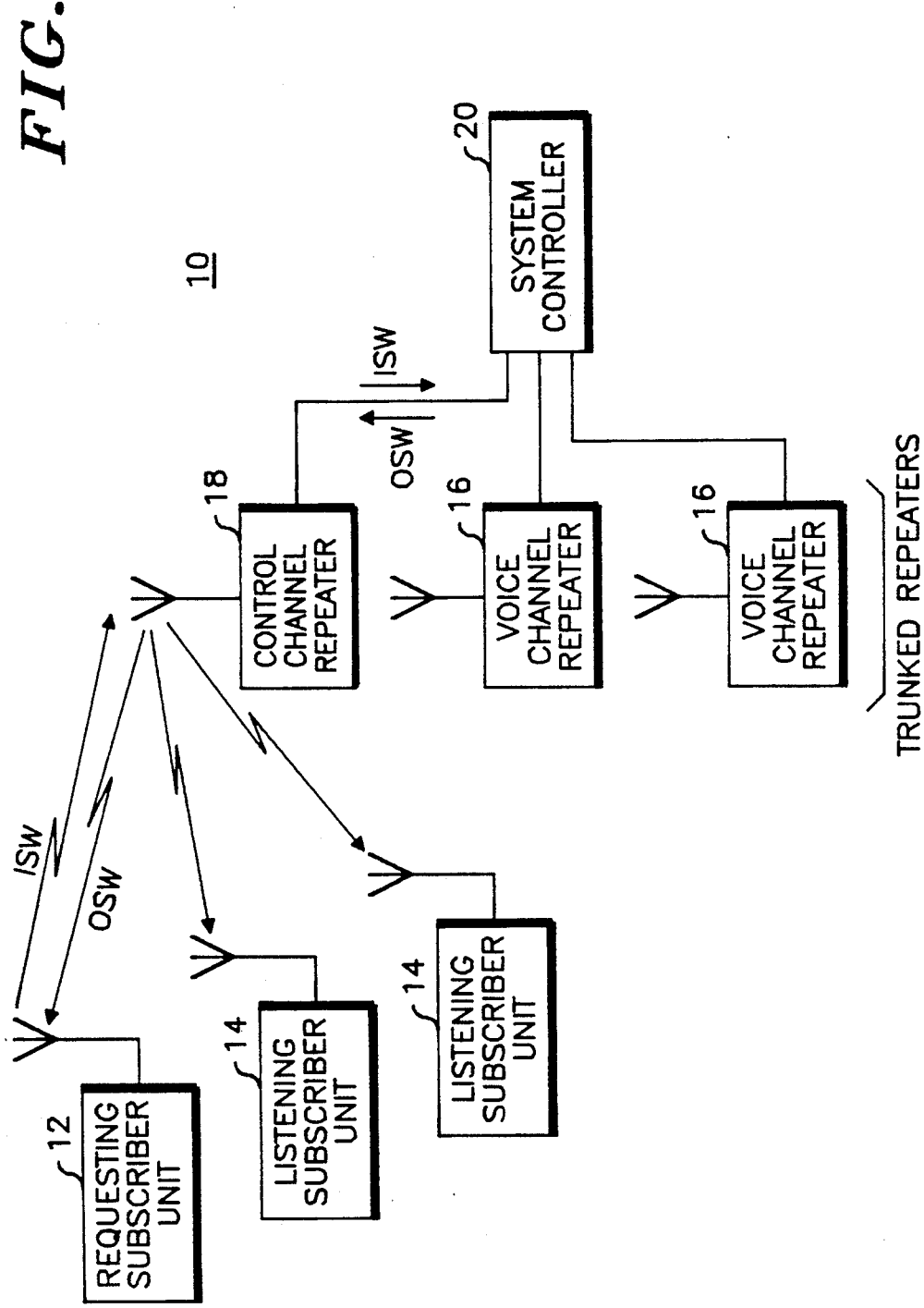

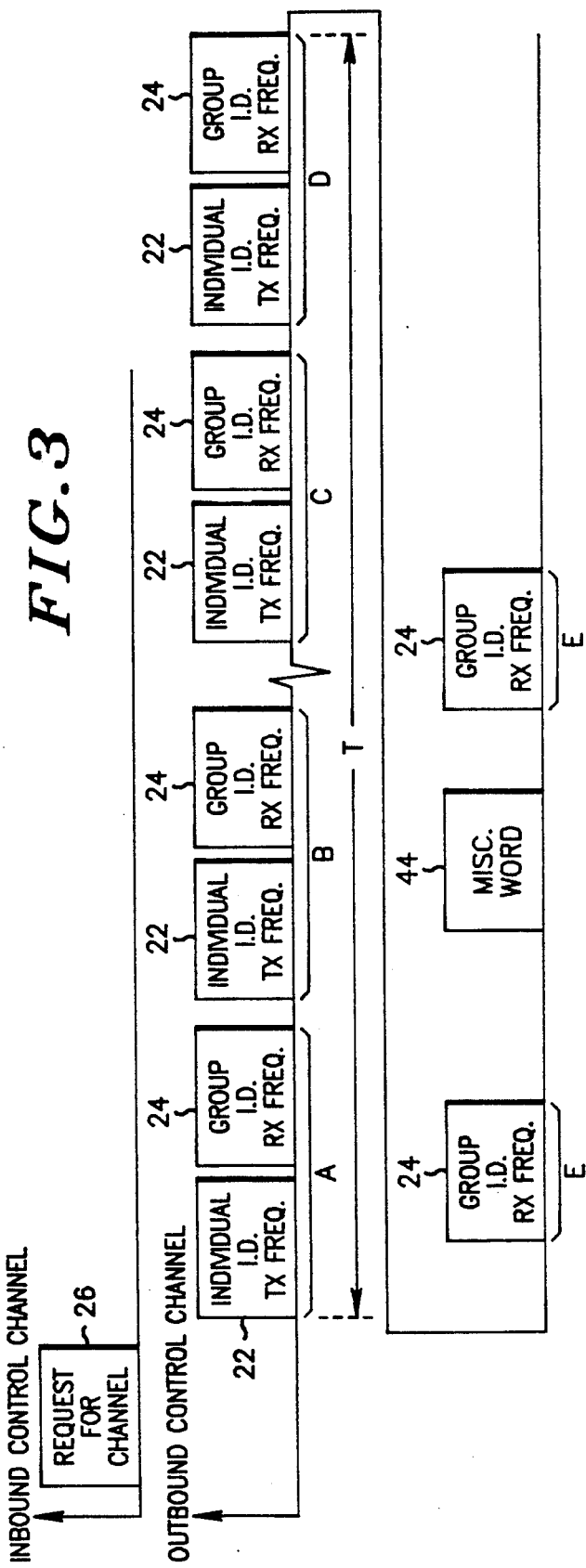

UNIVERSAL FREQUENCY ASSIGNMENT PROTOCOL FOR TRUNKED RADIO SYSTEMS

TECHNICAL FIELD

This invention relates generally to the field of communication systems and more particularly to trunked radio frequency communication systems operating in spectrum having unassigned frequency pairs.

BACKGROUND ART

Many trunked radio communication systems provide at least one control channel and two or more user channels. Each channel comprises a pair of frequencies, one inbound and one outbound, where inbound messages are transmitted to a system controller and outbound messages are transmitted by the system controller. The system controller regulates the use of the user channels by receiving channel assignment requests from various subscriber units on the inbound control frequency, and transmitting a code containing the channel assignment on the outbound control frequency.

In one such system, the channel assignment code constitutes a 10 bit field in an outbound signalling word (OSW) (i.e., a word transmitted by the system controller on the outbound control frequency). The channel assignment code typically identifies only the assigned transmit frequency. Since transmit and receive frequencies are preassigned as known pairs in many countries and bands, the receiving subscriber unit can calculate both the assigned transmit and receive frequencies using a simple algorithm based on the channel assignment code. This method allows new channels to be added to a system without concurrently requiring reprogramming of all subscriber units.

This protocol works well in the current 800 and 900 MHz bands in the United States where trunked RF communications are currently offered and allowed. In these bands, the designated channel plan identifies specific frequency pairs, requires a constant offset between the transmit and receive frequencies, and also provides for a constant channel spacing within the band. The OSW bit field described above provides sufficient room to allow for the proper number of channel permutations in these bands. Further, by knowing either the transmit or receive frequency, the other can be calculated given the constant offset utilized in these bands.

Trunked RF communications, however, are now moving to other bands, including VHF and UHF. In these other bands, a constant offset between transmit and receive frequencies does not exist. Furthermore, constant channel spacing has not been provided throughout a given band. Also, within a band, the number of channels possibly available for use exceeds the number of permutations available in the current 10 bit channel field.

A need exists for allowing current trunked communication systems using 10 bit channel fields to provide proper channel assignments in these bands.

SUMMARY OF THE INVENTION

These needs and others are substantially met through provision of the invention disclosed herein. Pursuant to one embodiment of this invention, the system controller transmits identifying information for both the transmit and receive frequencies. The subscriber units then separately process this identifying information to thereby separately determine and use the assigned transmit and receive frequencies.

In one embodiment, the identifying information is transmitted in two words, with the first word containing the transmit frequency information and the second word containing the receive frequency information. These words are transmitted as a pair.

In another embodiment, the second word, containing the receive frequency information, can be transmitted alone from time to time following the original channel grant to allow subscriber units that may have lost the original channel grant information to again locate a communication in process.

In another embodiment of this invention, the subscriber units are provided with a memory having information stored in it. This information can include one or more base frequencies, channel numbers that correspond to each base frequency, and a channel spacing value that corresponds to each base frequency.

Upon receiving the identifying information (which includes a channel number code), the subscriber unit compares that information against its stored channel numbers to identify which stored channel number is both: (A) smaller than or equal to the channel number code as transmitted by the central unit; and (B) larger than all other stored channel numbers that are also smaller than or equal to the channel number code. The subscriber unit then subtracts the identified stored channel number from the received channel number code to yield a subtraction result. This result is multiplied by the channel spacing value that corresponds to the identified channel number to yield a product. The base frequency that corresponds to the identified channel number is then added to this product to yield a frequency assignment. The process then repeats to obtain the remaining assigned frequency.

BRIEF DESCRIPTION OF THE DRAWINGS

FIG. 1 comprises a block diagram depiction of the system;

FIG. 2 comprises outbound signalling word channel assignment formats;

FIG. 3 comprises a timing diagram for inbound and outbound messages as regards the channel grant protocol;

BEST MODE FOR CARRYING OUT THE INVENTION

Figure 4:
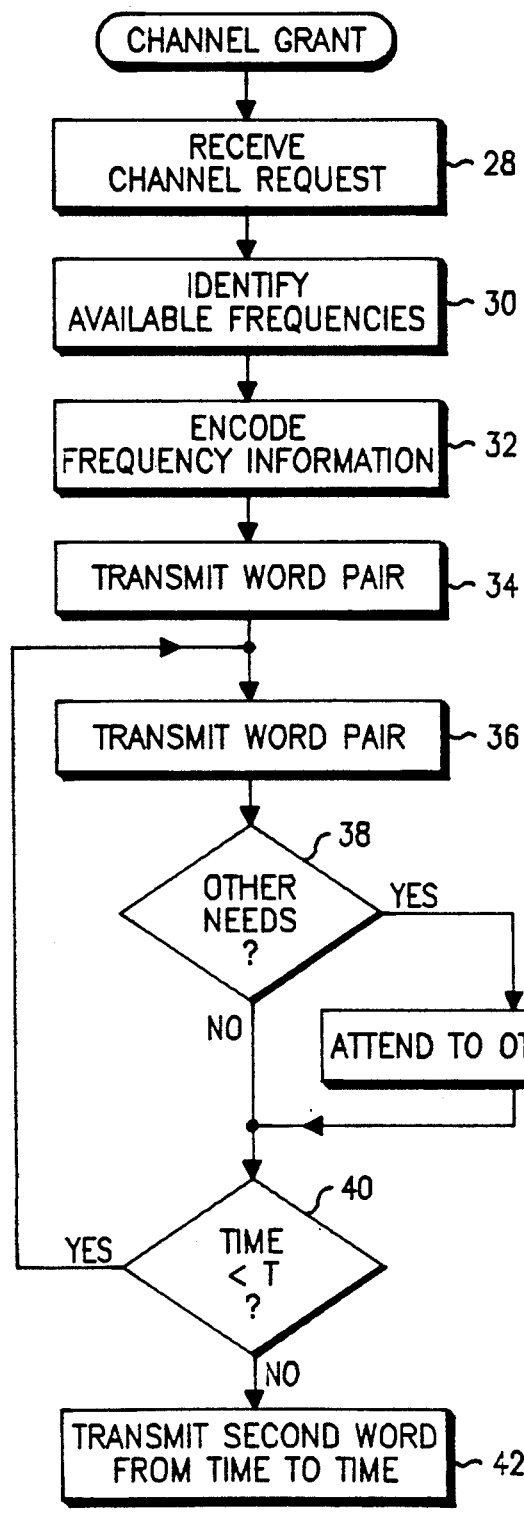
FIG. 4 comprises a flow chart depicting the channel grant procedure.

Referring now to FIG. 1, a trunked radio communication system can be seen as depicted generally by the numeral 10. The system (10) includes generally a plurality of subscriber units (12 and 14) (as used herein, "subscriber units" refers to mobile units, portable units, or fixed location units), trunked repeaters (16), and a system controller (20). When not otherwise engaged in a voice or other communication, the subscriber units (12 and 14) monitor the outbound frequency of the repeater (18) that supports the control channel.

In general, to establish a dispatch call between a group of subscriber units operating on such a system (10), a requesting subscriber unit (12) sends a data packet called an ISW (inbound signalling word) on the inbound frequency of the control channel repeater (18). The ISW typically contains the requesting subscriber unit's unique ID code (consisting of a fleet ID and an individual ID, plus a subfleet code indicating that group of units which the requesting subscriber unit wishes to talk to). The ISW may also contain a unique call type code which indicates that a dispatch call is the type of call requested (as versus, for example, a telephone interconnect call). The system controller (20) decodes the request, and transmits an appropriate channel grant OSW to all subscriber units that are monitoring the outbound control channel (further detail regarding the format of the channel grant OSWs and the channel grant protocol will be provided below). The channel grant OSW causes the requesting unit (12) to move to the designated voice channel for transmission and reception purposes. In this way, a group or subfleet call conversation can be established.

Additional information regarding trunked RF communications in general can be found in U.S. Pat. No. 4,012,597 to Lynk, Jr. et al. entitled Transmission Trunk Multichannel Dispatch System With Priority Queing and U.S. Pat. No. 4,672,601 to Ablay entitled "Duplex Interconnect/Dispatch Trunked Radio System." Both references are incorporated herein by reference.

Referring to FIG. 2, the system controller (20) transmits a channel grant assignment using two words; a first word (22) and a second word (24). The first word (22) includes a sixteen bit field for the individual ID of the requesting subscriber unit (12), a one bit field for group ID VS individual ID distinction, and a ten bit field for the transmit frequency channel number code. The transmit frequency code can be any number between 0 and 379. The second word (24) includes a sixteen bit field for the group ID of those subscriber units that the call is directed to, a one bit field for group ID VS individual ID distinction, and a ten bit field for the received frequency channel number code. The received frequency channel number code can be any number between 380 and 759.

Ordinarily, these two words (22 and 24) are transmitted as a pair as described below in more detail, although the second word (24) can be transmitted alone under certain circumstances. Additional information regarding such dual word signalling can be found in U.S. Pat. No. 4,692,945 to Zdunek entitled "Dispatch Trunked Radio System." This reference is incorporated herein by reference.

With reference to FIGS. 3 and 4, the channel grant procedure will now be described. When a subscriber unit (12) seeks to establish a communication link, the requesting subscriber unit (12) transmits a request for channel ISW (26) (FIG. 3) on an inbound control frequency, which request is received (28) (FIG. 4) by the system controller (20). The system controller then identifies available frequencies (30) (FIG. 4). For purposes of this description, it will be presumed that channels are available when requested. If channels are not available, the system controller (20) must generally respond by providing a signal to the requesting subscriber unit indicating that service must currently be denied.)

The system controller then encodes the frequency information that constitutes the channel grant assignment (32) (FIG. 4) and transmits the channel grant as a word pair (34) (FIG. 4). This word pair (A) (FIG. 3) comprises a first word (22) (FIG. 3) and a second word (24) (FIG. 3) that include the appropriate transmit and receive frequency channel number codes, as described below in more detail. The system controller then repeats transmission of the word pair (36) (FIG. 4) (as also depicted in FIG. 3 by the reference letter "B").

The system controller then attends to other system needs to the extent that may be required (38) (FIG. 4). Then, presuming that a predetermined time (T) (FIG. 3) (such as 650 milliseconds) has not yet expired (40) (FIG. 4), the system controller causes another transmission of the word pair (22 and 24) (as depicted in FIG. 3 by the reference character "C"). When the predetermined period of time (T) expires, the system controller then transmits only the second word (42) (FIG. 4) from time to time (as also depicted in FIG. 3 by the reference character "E") in order to allow subscriber units that have returned to the control channel for whatever reason to locate and return to the communication in process. These retransmissions of the second word (24) will of course be interleaved with other outbound signalling words (44) (FIG. 3) related to operation of the system.

In general the first and second words are first transmitted as a pair at least a predetermined number of times (such as twice), but no more than a maximum predetermined number of times (such as four times), all within a predetermined period of time.

Figure 5:
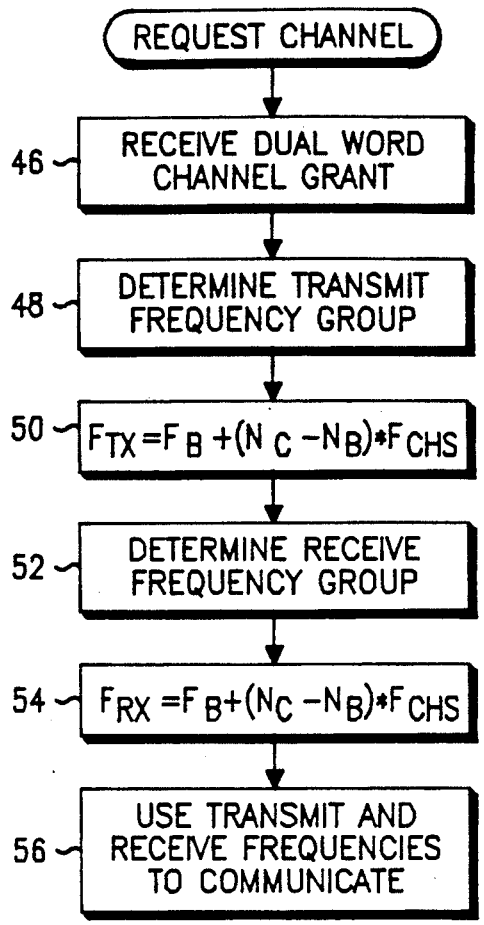
FIG. 5 comprises a flow chart depicting the channel decoding procedure.

With reference to FIG. 5, and as described above, subscriber units monitoring the outbound control frequency receive a dual word channel grant (46). The first word (22) can then be appropriately decoded and parsed in accordance with well understood prior art technique to determine the transmit frequency channel number code. With this information, the subscriber unit can identify the appropriate transmit frequency group (48). In particular, each subscriber unit has stored in a memory a table of information such as that represented by table 1 below.

TABLE 1

| CHANNEL | BASE FREQUENCY | CHANNEL SPACING |
|---------|----------------|-----------------|
| 000     | 402.0000 MHz   | 25 KHz          |
| 100     | 410.0000 MHz   | 25 KHz          |
| 250     | 416.7500 MHz   | 20 KHz          |

In this table, 3 channel numbers are stored (000, 100, and 250). Each channel number has a base frequency associated therewith (for example, channel number 000 has a base frequency of 402.0000 MHz). Further, each channel number has a channel spacing value that corresponds to it (for example, channel number 000 has a 25 KHz channel spacing value).

With this information, a subscriber unit can identify an appropriate transmit frequency group (48) by comparing the received transmit frequency channel number code with the stored channel numbers, by locating that stored channel number that is the largest of all of the stored channel numbers that are equal to or smaller than the transmit frequency channel number code. For example, if the transmit frequency channel number code received by the subscriber unit were "61," the information stored in the table corresponding to channel number "000" would be selected. In the alternative, if the transmit frequency channel number code were "101," then stored channel number "100" would be selected.

With the information selected from the memory corresponding to the selected channel number, the subscriber unit will then compute this algorithm:

$$F_{TX} = F_B + (N_C - N_B) * F_{chs}$$

where:

$F_{TX}$ = the transmission frequency;
$F_B$ = the base frequency (from the stored table);
$N_C$ = received transmit frequency channel number code;
$N_B$ = channel number (from the stored table); and
$F_{chs}$ = channel spacing value (from the stored table).

For example, if the received transmit frequency channel number code was "61," then, given the above illustrative values: $F_{TX} = 402.0000 + (061 - 000)*25$ KHz = 403.5250 MHz.

In a similar manner, the subscriber unit can decode the second word (24), determine the receive frequency channel number code, and then identify the appropriate receive frequency group (52) using the same procedure described above. The subscriber unit can then determine the receive frequency ($F_{RX}$) through use of the same algorithm. The subscriber unit then uses the calculated transmit and receive frequencies to facilitate the desired communications (56).

Through use of this protocol and algorithm, any one of 380 channels within a target band can be assigned. Since a typical system will usually have a maximum of 20 channels, these 380 permutations could be clustered around the current system channel allocation. Reprogramming of subscriber units would not then be required each time a new channel was added to the system. Furthermore, this same protocol will function over various bands having differing channel spacing allocations and will accommodate completely arbitrarily paired frequencies.

We claim:

1. In a communication system having:
   a plurality of subscriber units;
   a system controller for assigning transmit and receive communication frequencies for use by at least some of said plurality of subscriber units, wherein said system controller transmits identifying information to at least some of said subscriber units, said identifying information is used by at least some of said subscriber units to determine assigned transmit and receive communication frequencies, an improvement comprising:
   said at least one system controller being constructed and arranged to send said identifying information, wherein said identifying information for said transmit communication frequency is included in a first word, and said identifying information for said received communication frequency is included in a second word; and
   at least some of said subscriber units are constructed and arranged to separately process said identifying information to separately determine said assigned transmit and receive communication frequencies.

2. The improvement of claim 1 wherein said first word and said second word are transmitted a plurality of times, each time as a pair.

3. The improvement of claim 2 wherein said second word is transmitted alone from time to time subsequent to said first and second words being transmitted as a pair.

4. The improvement of claim 1 wherein said first word and said second word are transmitted as a pair at least a first predetermined number of times, and no more than a second predetermined number of times.

5. The improvement of claim 4 wherein said first word and said second word are transmitted as pairs only within a predetermined period of time.

6. A method of assigning a transmit and a receive communication frequency to a subscriber unit, the method comprising the steps of:
   (A) transmitting to said subscriber unit a first message comprising identifying information that relates to said transmit communication frequency;
   (B) transmitting to said subscriber unit a second message comprising identifying information that relates to said receive communication frequency;
   (C) receiving, in said subscriber unit, said first and second messages;
   (D) processing, in said subscriber unit, said first and second messages to determine said transmit and receive communication frequencies.

7. The method of claim 6 wherein said first message and said second message are transmitted as a pair.

8. The method of claim 7 wherein, following the step of transmitting said first message and said second message as a pair, said second message is transmitted alone from time to time.

9. The method of claim 6, wherein step D includes the steps of:
   (D1) providing, in a memory:
      (i) at least one base frequency;
      (ii) a channel number corresponding to each said base frequency;
      (iii) a channel spacing value corresponding to each said base frequency;
   (D2) processing said first message to obtain a transmit frequency code;
   (D3) identifying which of said channel numbers is:
      (i) smaller than or equal to said transmit frequency code; and
      (ii) larger than all other channel numbers that are also smaller than or equal to said transmit frequency code;
   (D4) subtracting said identified channel number from said transmit frequency code to yield a subtraction result;
   (D5) multiplying said subtraction result by said channel spacing value that corresponds to the base frequency that corresponds to said identified channel number to yield a product;
   (D6) adding said base frequency that corresponds to said identified channel number to said product to determine said transmit communication frequency.

10. The method of claim 6 wherein step D comprises the steps of:
    (D1) selecting one of said first and second messages;
    (D2) comparing said selected message with stored information to identify a channel group;
    (D3) processing stored information corresponding to said identified channel group and information in said selected message to identify an assigned communication frequency;
    (D4) select the previously unselected one of said first and second messages as said selected message, and repeat steps B and C to identify a remaining assigned communication frequency.

11. A method of decoding channel assignment messages, comprising the steps of:
    (A) providing, in a memory:
       (i) at least one base frequency;
       (ii) a channel number corresponding to each said base frequency;
       (iii) a channel spacing value corresponding to each said base frequency;
    B) identifying which of said channel numbers is:

(i) smaller than or equal to said channel assignment message; and (ii) larger than all other channel numbers that are also smaller than or equal to said channel assignment message;

(C) subtracting said identified channel number from said channel assignment message to yield a subtraction result;

(D) multiplying said subtraction result by said channel spacing value that corresponds to the base frequency that corresponds to said identified channel number to yield a product;

(E) adding said base frequency that corresponds to said identified channel number to said product to determine an assigned frequency.

12. A method of decoding channel assignment messages, wherein the channel assignment messages comprise a first message that includes transmit frequency information and a second message that includes receive frequency information, comprising the steps of:

(A) selecting one of said first and second messages;

(B) comparing said selected message with stored information to identify a channel group;

(C) processing stored information corresponding to said identified channel group and information in said selected message to identify an assigned frequency;

(D) selecting the previously unselected one of said first and second messages as said selected message, and repeating steps B and C to identify a remaining assigned frequency.

* * * * *